(12) United States Patent
Werner et al.

(10) Patent No.: US 8,505,492 B2
(45) Date of Patent: Aug. 13, 2013

(54) VIBRATORY HAIR GROOMING TOOL

(75) Inventors: Edwin A. Werner, Union Grove, WI (US); Matthew K. Andis, Sturtevant, WI (US)

(73) Assignee: Andis Company, Sturtevant, WI (US)

( * ) Notice: Subject to any disclaimer, the term of this patent is extended or adjusted under 35 U.S.C. 154(b) by 917 days.

(21) Appl. No.: 12/164,825

(22) Filed: Jun. 30, 2008

(65) Prior Publication Data
US 2009/0320767 A1 Dec. 31, 2009

(51) Int. Cl.
*A01K 13/00* (2006.01)

(52) U.S. Cl.
USPC .......................................... 119/609; 119/633

(58) Field of Classification Search
USPC ................. 119/608–610, 633, 600, 613, 617, 119/625
IPC ....................................................... A01K 13/00
See application file for complete search history.

(56) References Cited

U.S. PATENT DOCUMENTS

| | | | | |
|---|---|---|---|---|
| 894,011 A * | 7/1908 | Kampfe | ............................. | 15/48 |
| 1,764,626 A * | 6/1930 | Heckman | ......................... | 15/384 |
| 3,183,591 A * | 5/1965 | Dumont | ......................... | 30/123 |
| 3,853,133 A * | 12/1974 | Komatsu et al. | ........... | 132/119.1 |
| 4,084,282 A * | 4/1978 | Calvert | ............................. | 15/38 |
| 5,845,603 A * | 12/1998 | Efaw | ............................. | 119/605 |
| 5,862,780 A | 1/1999 | Landreneau | | |
| 6,024,052 A * | 2/2000 | Efaw | ............................. | 119/625 |
| 6,109,214 A * | 8/2000 | Rampersad | .................... | 119/600 |
| 6,336,428 B1 * | 1/2002 | Locke | ........................... | 119/625 |
| 6,722,374 B2 * | 4/2004 | Hwang | ....................... | 132/119.1 |
| 6,782,846 B1 | 8/2004 | Porter et al. | | |
| 7,077,076 B2 | 7/2006 | Porter et al. | | |
| 7,124,712 B2 * | 10/2006 | Berman et al. | ................. | 119/628 |
| 7,222,588 B2 | 5/2007 | Porter et al. | | |
| 7,334,540 B2 | 2/2008 | Porter et al. | | |
| 7,509,926 B2 | 3/2009 | Porter et al. | | |
| 7,621,234 B2 * | 11/2009 | Roy | ............................... | 119/628 |
| 7,665,422 B2 * | 2/2010 | Kissel, Jr. | ..................... | 119/609 |
| 2007/0068546 A1 | 3/2007 | Lipawsky | | |
| 2007/0084416 A1 * | 4/2007 | Liao | ............................. | 119/625 |
| 2007/0119383 A1 | 5/2007 | Porter et al. | | |
| 2008/0052844 A1 | 3/2008 | McKay | | |

(Continued)

FOREIGN PATENT DOCUMENTS

| | | |
|---|---|---|
| CN | 2925083 | 7/2007 |
| EP | 0232819 | 8/1987 |

OTHER PUBLICATIONS 09251634.3 extended European Search Report dated Aug. 28, 2009 (8 pages).

(Continued)

*Primary Examiner* — Son T Nguyen
*Assistant Examiner* — Shadi Baniani
(74) *Attorney, Agent, or Firm* — Michael Best & Friedrich LLP (57) ABSTRACT

A hair grooming tool including a housing defining a cavity and including a grooming end, a vibratory motor assembly positioned within the cavity and configured to vibrate the housing, and a pet-engaging member coupled to the housing at the grooming end. Vibration of the housing enables constant motion of the hair tool and movement of the pet-engaging member as the pet-engaging member is pulled through hair to remove loose hair without cutting the hair.

11 Claims, 7 Drawing Sheets

(56) References Cited

U.S. PATENT DOCUMENTS

| | | | |
|---|---|---|---|
| 2008/0052849 A1 | 3/2008 | McKay | |
| 2008/0052850 A1* | 3/2008 | McKay | 15/114 |
| 2009/0107413 A1* | 4/2009 | Shiloni et al. | 119/609 |
| 2009/0126649 A1* | 5/2009 | Porter et al. | 119/601 |
| 2009/0293225 A1* | 12/2009 | Freidell | 15/402 |

OTHER PUBLICATIONS

"ShedEnder Professional De-Shedding Tool," product description, 4 pages, Oct. 29, 2008 website printout at http://www.asseenontvguys.com/index.asp?PageAction=VIEWPROD&ProdID=83. (Date of advertisement: At least as early as Jun. 30, 2008.).

"Bamboo Cat De-Shedding Comb," product description, 1 page, Oct. 29, 2008 website printout at http://www.amazon.com/Bamboo-820001-Cat-De-Shedding-Comb/dp/B000G18DAC. (Date of advertisement: At least as early as Jun. 30, 2008.).

Kim Laube & Co., "De-Shedding Lazor Blade Rake," product description, 1 page, Oct. 29, 2008 website printout at http://www.kimlaubecoshop.com/desheddinglazorbladerake-ratchet.aspx. (Date of advertisement: At least as early as Jun. 30, 2008.).

First Office Action from the State Intellectual Property Office of the People's Republic of China for Application No. 200910139660.7 dated Sep. 17, 2012 (16 pages).

Office Action from the European Patent Office for Application No. 09251634.3 dated Jan. 16, 2013 (6 pages).

Second Office Action from the State Intellectual Property Office of the People's Republic of China for Application No. 200910139660.7 dated Mar. 28, 2013 (6 pages).

* cited by examiner

FIG. 7

VIBRATORY HAIR GROOMING TOOL

BACKGROUND

The present invention relates to a hair tool, and more specifically, to a hair tool for removing loose hair from the body of an animal.

Animals tend to shed hair on a regular basis. The shed hair, or loose hair, may sit under an animal's healthy coat until it falls off or is rubbed off by movement of the animal, such as by lying on furniture or rubbing on carpet. The loose hair may also clump on longer hair of the animal and cause matting of the fur. Removal of the clumped hair may be difficult without clipping the animal's hair to a shorter length. To remove the hair, the animal may become irritable due to tugging on the animal's hair or poking the animal with a sharp edge of the hair removal tool.

SUMMARY

In one embodiment, the invention provides a hair grooming tool including a housing defining a cavity and including a grooming end, a vibratory motor assembly positioned within the cavity and configured to vibrate the housing, and a pet-engaging member coupled to the housing at the grooming end. Vibration of the housing enables constant motion of the hair tool and movement of the pet-engaging member as the pet-engaging member is pulled through hair to remove loose hair without cutting the hair.

In another embodiment, the invention provides a hair grooming tool for use on an animal having a coat of hair. The hair grooming tool including a housing having a grooming end and a handle end, a motor at least partially disposed in the housing, wherein the motor is a vibratory motor, and a pet-engaging member coupled to the housing at the grooming end. Operation of the motor assembly causes vibration of the housing. The pet-engaging member is configured to be pulled in a first direction along the coat of the animal to remove loose hair without cutting the hair, such that the pet-engaging member follows the handle end.

In another embodiment, the invention provides a hair grooming tool for removing loose hair from a coat of an animal. The hair grooming tool includes a housing including an upper housing and a lower housing, a motor assembly housed in a cavity defined by the upper housing and the lower housing and configured to vibrate the housing, and a pet-engaging member coupled to the lower housing and configured for movement through the coat of the animal. Vibration of the housing vibrates the pet-engaging member as the pet-engaging member is pulled through the coat of the animal to remove loose hair without cutting the hair.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
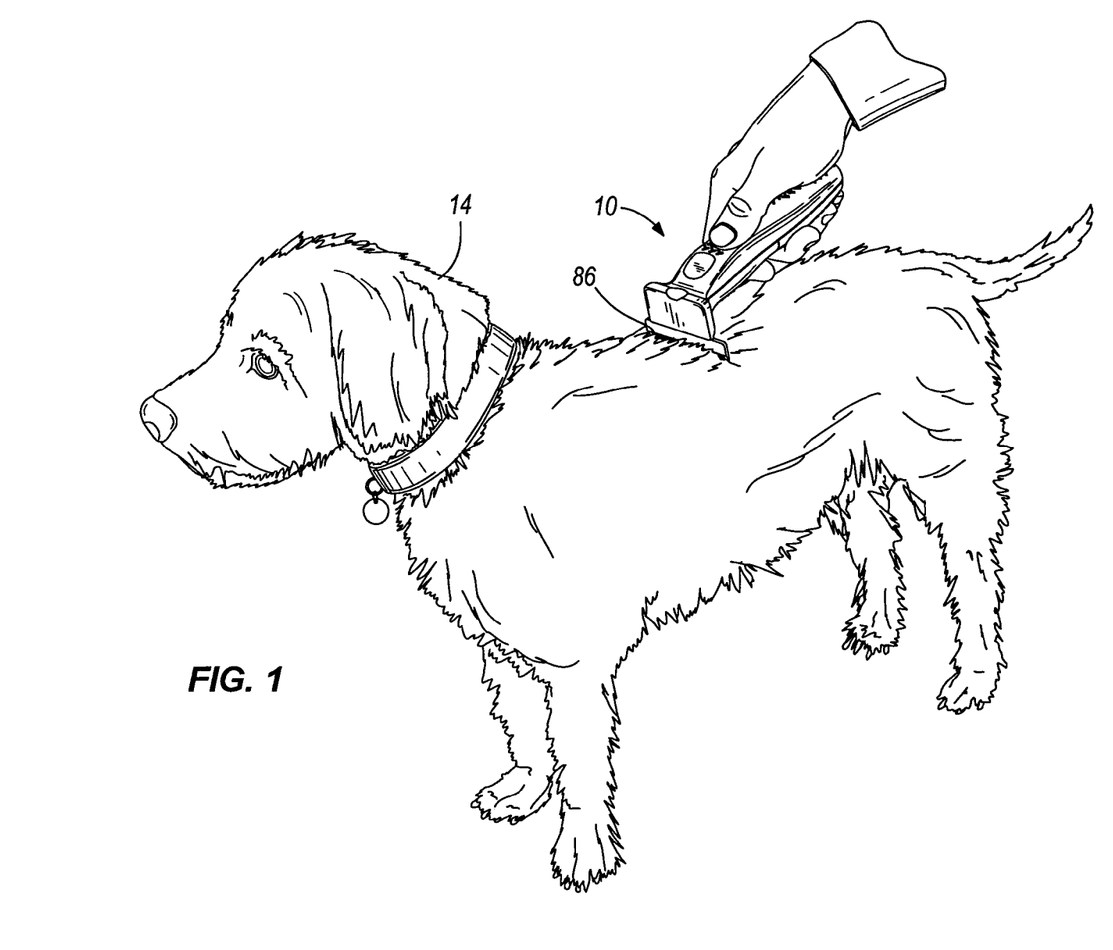
FIG. 1 is a perspective view of a hair tool according to an embodiment of the invention, the hair tool being used on an animal.
Figure 2:
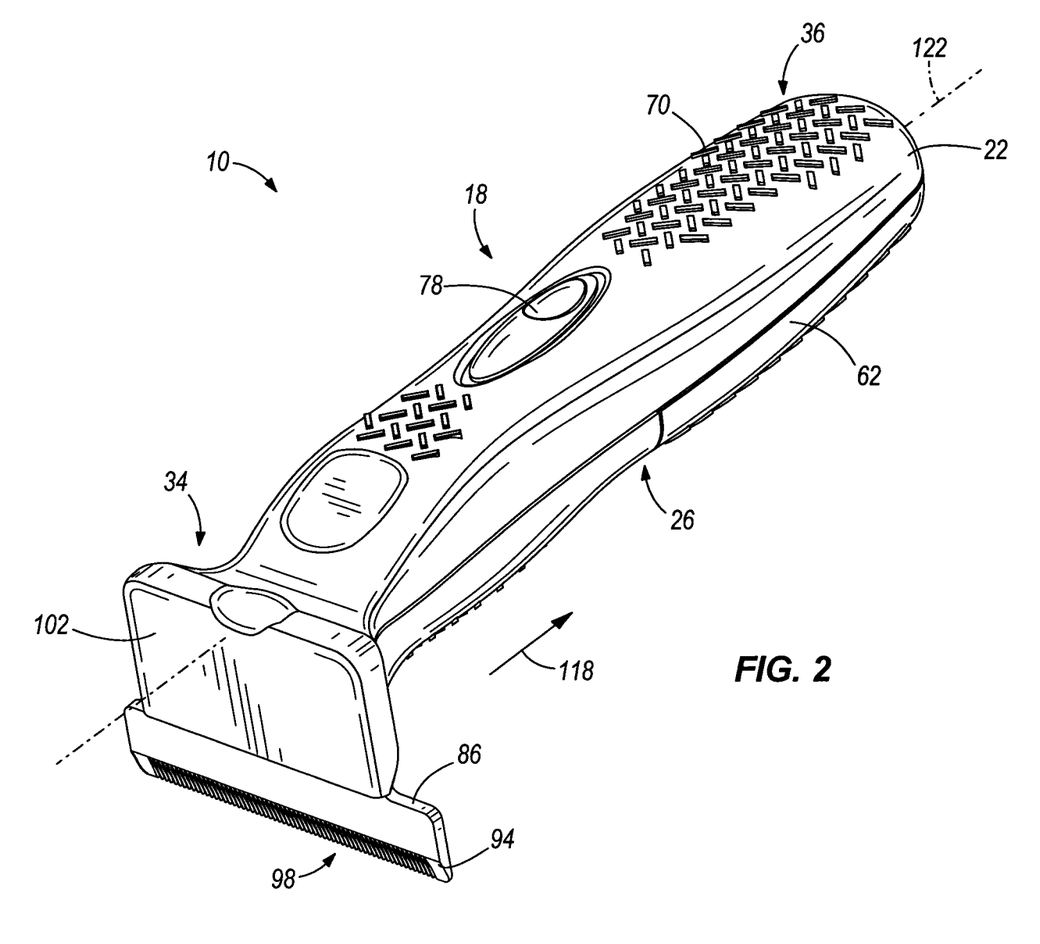
FIG. 2 is a perspective view of the hair tool of FIG. 1.
Figure 3:
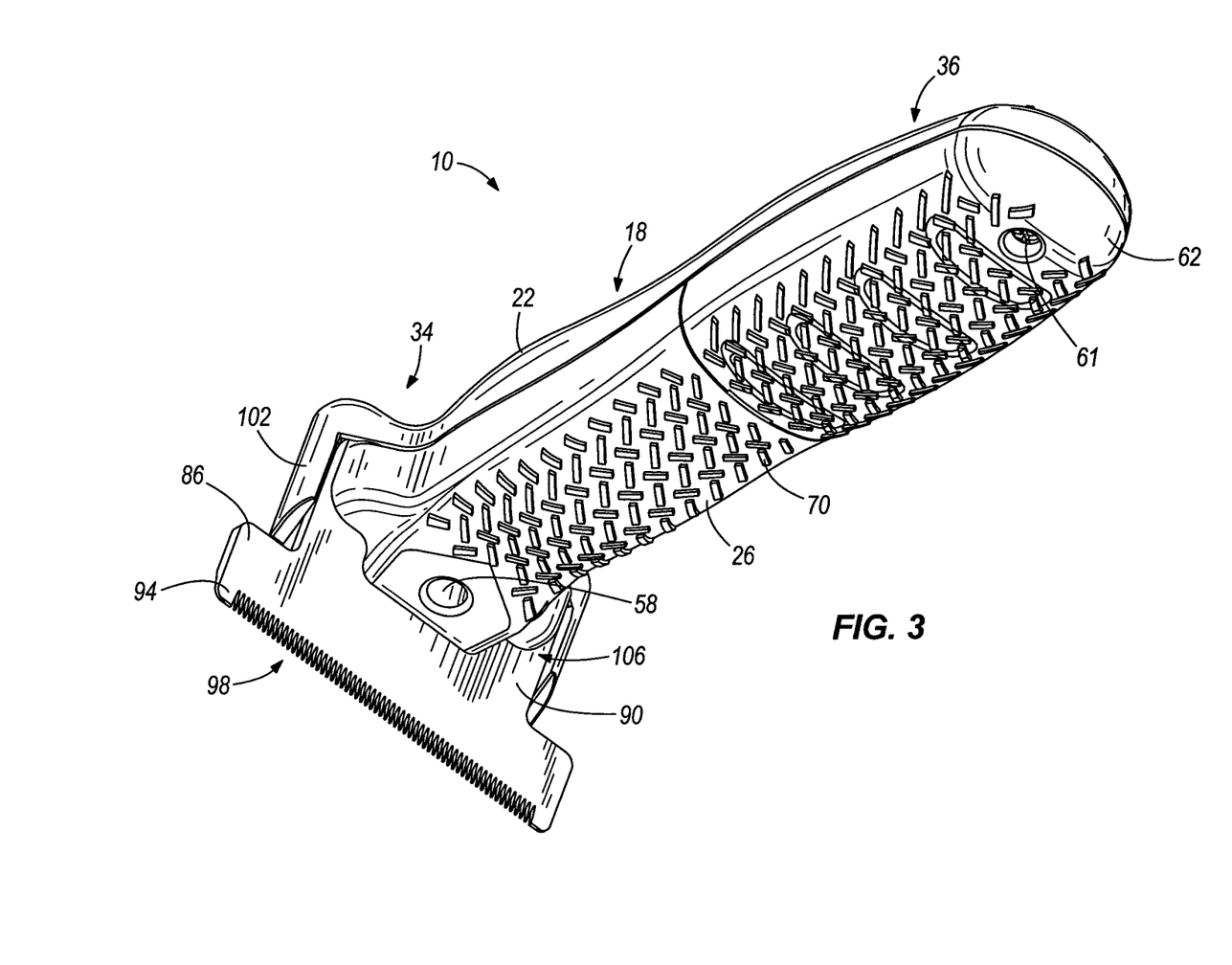
FIG. 3 is a bottom perspective view of the hair tool of FIG. 1.
Figure 4:
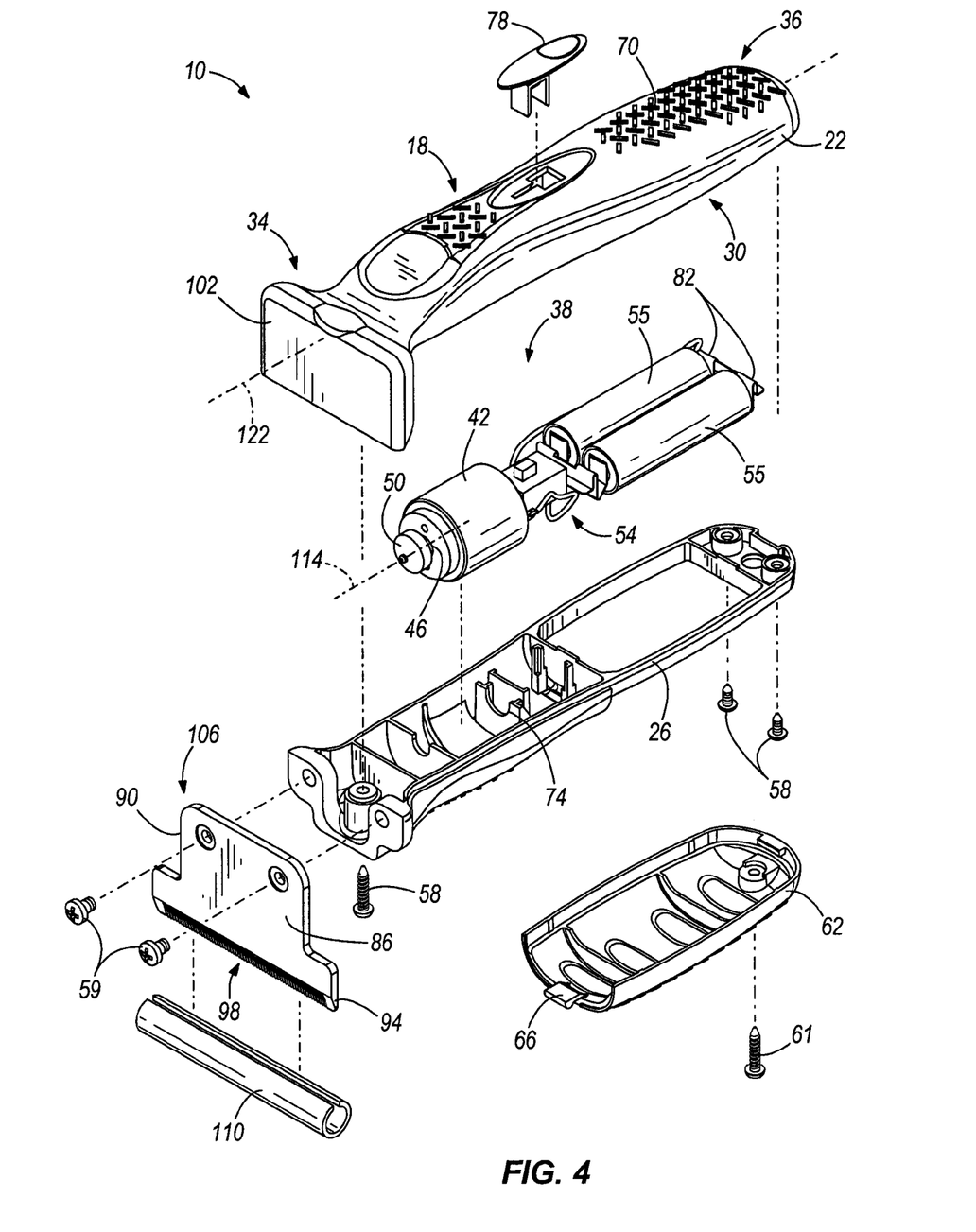
FIG. 4 is an exploded view of the hair tool of FIG. 1.
Figure 4A:
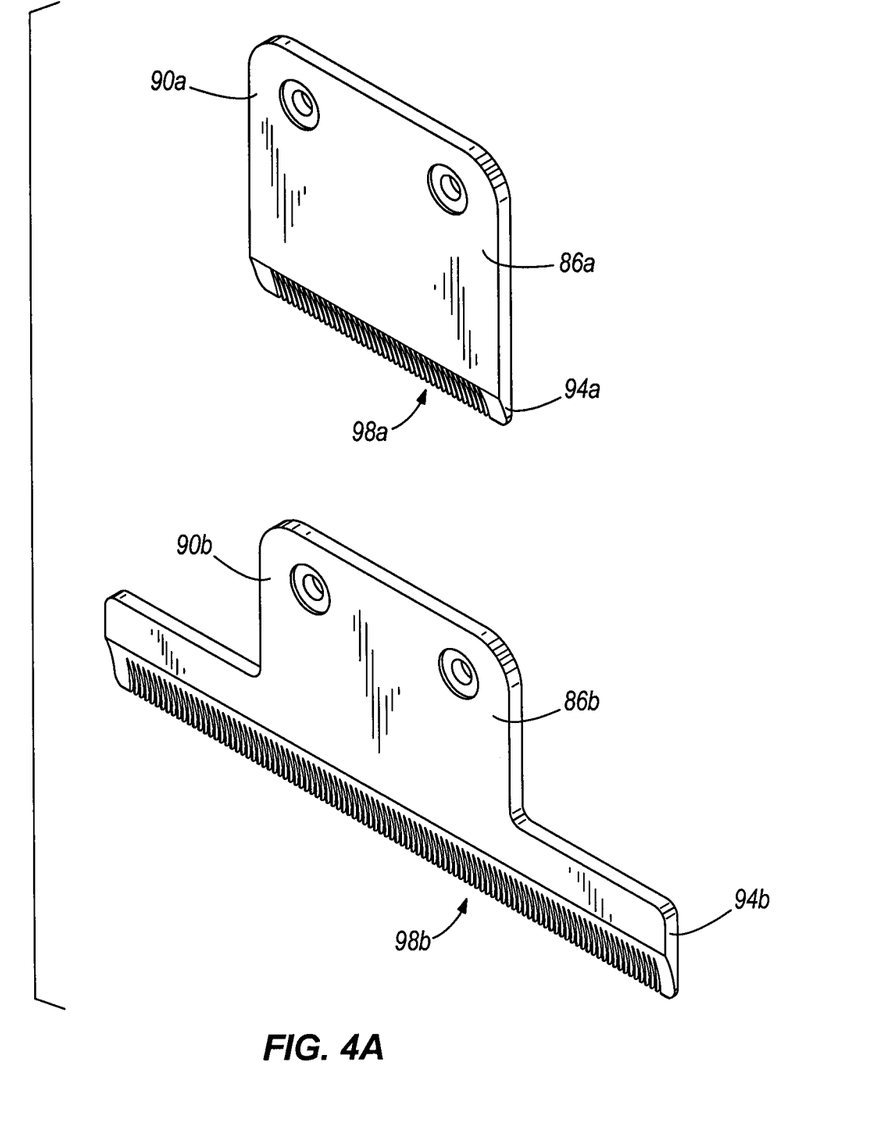
FIG. 4A is a perspective view of pet-engaging members configured for use with the hair tool of the invention.

FIGS. 1-4 illustrate a hair tool 10 according to an embodiment of the invention. More specifically, FIG. 1 shows the hair tool 10 being used on an animal 14, FIGS. 2-3 show perspective views of the hair tool 10, and FIG. 4 shows a detailed exploded view of the hair tool 10. FIG. 4A illustrates different components that may be used with the hair tool 10, and FIGS. 5-7 each illustrate hair tools 210, 310, 410 according to further embodiments of the invention.

As shown in FIGS. 1-4, the hair tool 10 includes a hollow, elongated housing 18 having an upper housing 22 and a lower housing 26, and defining an inner cavity 30. The housing 18 further includes a grooming end 34 and a handle end 36 opposite the grooming end 34. The housing 18 surrounds various tool components, substantially located in the inner cavity 30, including, but not limited to, a motor assembly 38 including a motor 42 having a drive shaft 46, a vibration element 50 coupled to the drive shaft 46, and a power source 54. The upper housing 22 and the lower housing 26 are coupled together by fasteners 58 (FIG. 4). In the illustrated embodiment, the fasteners 58 are screws; however, in other embodiments, the fasteners may include, but are not limited to, a snap and lock mechanism, a push button, or other fastening device or mechanism. The fasteners 58 allow a user to decouple the upper housing 22 and lower housing 26 and gain access to the hair tool components. The lower housing 26 further includes an access cover 62 (FIG. 4) having a snap configuration 66 to allow quick access to the cavity 30 of the housing 18. A fastener 61 provides additional coupling of the access cover 62 to the housing 18. The access cover 62 provides user accessibility to the power source 54 without unfastening the upper housing 22 and the lower housing 26.

As shown in FIGS. 1-4, the housing 18 includes a grip 70 on the outer surface of the housing 18. The grip 70 is shown as a plurality of ridges configured to enable a comfortable and firm grip by the user. However, in other embodiments, the grip may be notches or similar material configured to enable a comfortable and firm grip by the user. The grip 70 is made of texturized plastic and further covered with a soft grip paint; however, in other embodiments, the grip 70 may be made of silicone or similar material. The housing 18 is further ergonomically designed to fit comfortably in the hand of the user.

An electric motor or actuator 42 is mounted in the inner cavity 30 and positioned between retention elements 74 integrally formed in the upper housing 22 and lower housing 26. The electric motor 42 is drivingly connected to the vibration element 50 through the drive shaft 46. The electric motor 42 is configured to effect vibration of the hair tool 10 in response to actuation of the motor 42. As the motor 42 rotates the drive shaft 46, the vibration element 50 coupled to the drive shaft 46 also rotates. The vibration element 50 is positioned at an offset or otherwise eccentric from a central rotation axis 114 of the drive shaft 46. Due to the offset of the vibration element 50 from the axis 114 of the rotating drive shaft 46, the rotation of the vibration element 50 causes vibration of the entire motor assembly 38. Since the vibrating motor assembly 38 is coupled to the housing 18, the housing 18 also vibrates.

For operation, the user actuates the motor 42 by using a power switch 78 provided on the housing 18. The power switch 78 is configured to interrupt the flow of electrical power from a power source 54 to the electric motor 42. The electrical power includes a direct current (DC) power provided by a battery (e.g., a rechargeable battery disposed in the cavity). FIG. 4 shows the power source 54 as batteries 55 received within battery terminals 82. In other embodiments, the electrical power may include an alternating current (AC) power provided via a corded plug electrically coupled to a wall outlet. Hair tools powered by AC and/or DC power are generally known in the art and, accordingly, are not discussed further herein. A number of suitable vibratory motors and driving arrangements are known. It should be appreciated that hair tools having other types of motors, power sources, and/or driving arrangements would be suitable for use in combination with the present invention.

Referring to FIGS. 1-4, the grooming end 34 of the hair tool 10 is configured to receive a pet-engaging member 86. The pet-engaging member 86 includes a body 90 and an edge 94 having a plurality of teeth 98. Edge 94 with teeth 94 measures approximately 2.8 inches in length; however, in other embodiments, the edge may measure more or less than 2.8 inches. The body 90 is coupled to the grooming end 34 of the hair tool 10 on the lower housing 26 with fasteners 59. The upper housing 22 further includes a cover portion 102 configured to substantially surround an upper portion 106 of the pet-engaging member 86. Teeth 98 extend from the edge 94 of the pet-engaging member 86, and are configured to remove loose hair from an animal's coat without cutting any hair or otherwise removing non-loose hair. The teeth may be dull or sharpened and are configured to be pulled through the hair of the animal's coat. In some embodiments, the teeth may have a polished finish. The pet-engaging member 86 is positioned at approximately ninety degrees with respect to the housing 18. The pet-engaging member 86 is fixed with respect to the housing; however, when using the hair tool 10, a user can position the hair tool 10 on the coat of the animal at any angle that is comfortable and effective for the user. The pet-engaging member 86 is made of steel, but may be made of any suitable material known in the art. In the illustrated embodiment, the pet-engaging member 86 is a blade with dulled teeth; however, in other embodiments, the pet-engaging member may be a comb or other device configured to remove loose hair without cutting the hair.

As shown in FIG. 4A, the number of teeth on the pet-engaging member may vary depending on the types of pet-engaging member used and grooming requirements for a particular animal. For example, for pet-engaging member 86a, the edge 94a with teeth 98a measures approximately 1.6 inches in length and is only as wide as the body 90a of the pet-engaging member 86a; however, in pet-engaging member 86b, the edge 94b with teeth 98b measures approximately four inches in length and extends beyond the body 90b of the pet-engaging member 86b further than the edge 94 and teeth 98 extend beyond the body 90 of pet-engaging member 86. The style of pet-engaging member may be suitable for the size of the animal for which the hair tool will be used. As shown in FIG. 4, a protector 110 may be positioned on the teeth 98 of the pet-engaging member 86 to protect the teeth 98 when the hair tool 10 is not in use. The protector 110 is made of plastic, but may be made of rubber or any suitable material known in the art. The protector is designed to fit specifically sized pet-engaging members.

To remove loose hair from the coat of the animal 14, the power switch 78 is activated by the user to start the motor assembly 38. As the housing 18 vibrates due to the vibration of the motor 42, the pet-engaging member 86, which is coupled to housing 18, also vibrates. Once the hair tool 10 is vibrating, the user places the pet-engaging member 86 of the hair tool 10 on the body of the animal (FIG. 1). To remove loose hair, the user moves or otherwise pulls the pet-engaging member 86 of the hair tool 10 in a first direction through the hair of the animal 14, while keeping the pet-engaging member 86 in contact with the animal 14, such that the pet-engaging member 86 follows the handle end 36. In the illustrated embodiment of FIGS. 1-4, the pet-engaging member 86 is pulled in the direction 118 parallel to the longitudinal axis 122 of the housing 18 and along the body of the animal, while maintaining contact with the body of the animal to remove the hair. In the illustrated embodiment, the pet-engaging member 86 is the only portion of the hair tool 10 that contacts the animal 14.

Vibration of the hair tool allows the hair tool to be manipulated through the hair of an animal with more ease compared to hair tools that do not vibrate. Vibration of the hair tool keeps the hair tool in constant motion, which enables movement of the hair tool along the coat of the animal while removing the loose hair. The vibration of the hair tool also provides a massage effect for the animal, which soothes and calms the animal and makes the hair removal process easier. The vibration also distracts the animal from any occasional tugging that may occur as the pet-engaging member is moved through dense clumps of hair. Although vibration of the hand tool correspondingly vibrates the pet-engaging member, the vibration of the pet-engaging member does not cut the hair since the pet-engaging member does not oscillate in a cutting fashion and is also not sharpened to cut hair.

Figure 5:
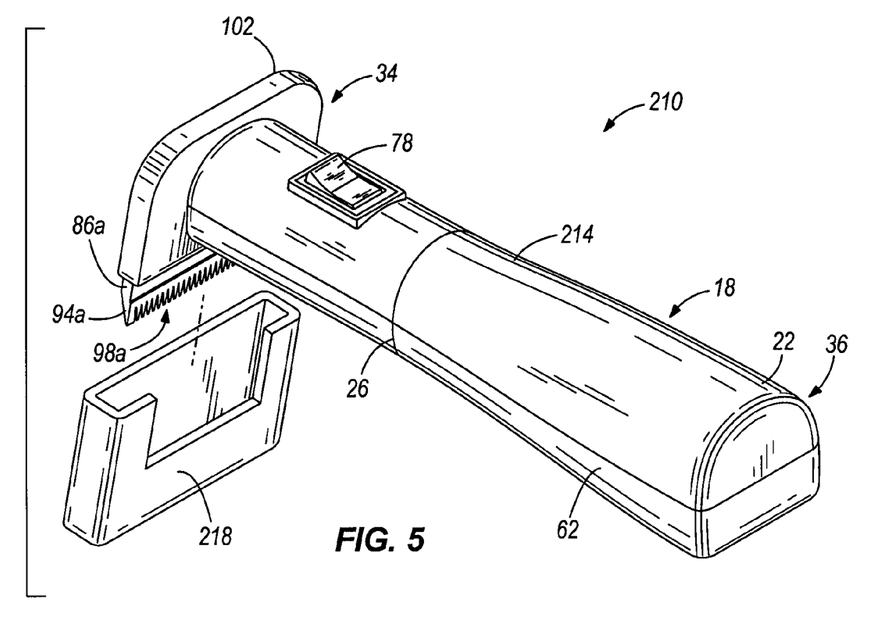
FIG. 5 is a rear perspective view of a hair tool according to another embodiment of the invention.

FIG. 5 shows a hair tool 210 according to another embodiment of the invention. The hair tool 210 shown in FIG. 5 includes similar structure to the hair tool 10 illustrated in FIGS. 1-4 and described above; therefore, like structure is identified by the same reference numeral. The hair tool 210 includes a housing 18 that has a smooth outer surface 214 and is ergonomically shaped to fit comfortably in the hand of a user. The pet-engaging member 86a is attached to the grooming end 34 of the hair tool 210. A protector 218 is shaped to substantially surround the pet-engaging member 86a and the cover portion 102 of the upper housing 22. The protector 218 is made of plastic; however, the protector may be made of any suitable material known in the art. Hair tool 210 further includes the same vibratory motor assembly as shown and described with respect to hair tool 10 to enable movement of hair tool 210 along the coat of an animal to remove loose hair without cutting the hair.

Figure 6:
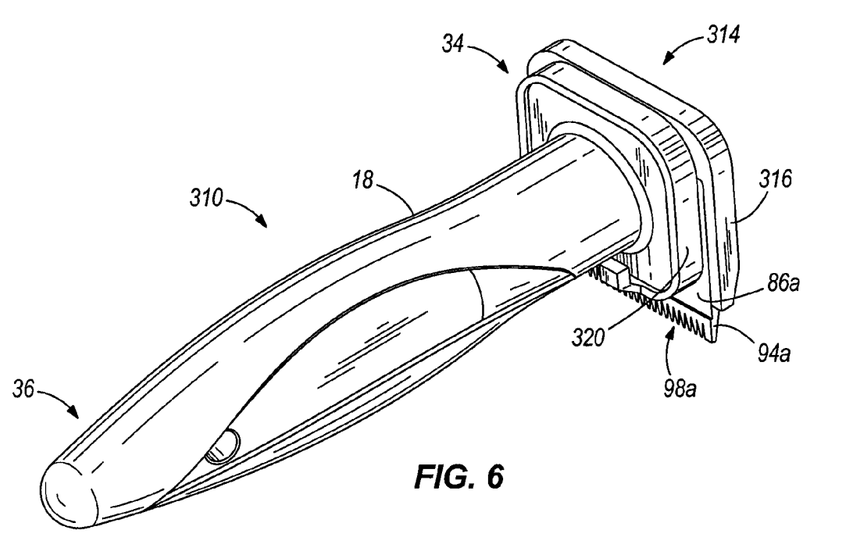
FIG. 6 is a rear perspective of a hair tool according to another embodiment of the invention.

FIG. 6 shows a hair tool 310 according to another embodiment of the invention. The hair tool 310 shown in FIG. 6 includes similar structure to the hair tool 10 illustrated in FIGS. 1-4 and described above; therefore, like structure is identified by the same reference numeral. The housing 18 has a smooth outer surface and is ergonomically shaped to fit comfortably in the hand of a user. The grooming end 34 of the housing 18 includes an assembly 314 configured for efficient interchangeability of the pet-engaging member 86a. The assembly 314 allows the user to change the pet-engaging member 86a for use of the hair tool 310 on different animals without having to decouple the upper housing from lower housing. In the illustrated embodiment, the pet-engaging member 86a is positioned within a front portion 316 of the assembly 314 and adjacent a rear portion 320. The front portion 316 is coupled to the rear portion 320 with a tab or similar coupling device (not shown). To change the pet-engaging member, the user uncouples the front portion 316 from the rear portion 320 by operating a push button release or similar mechanism on the assembly 314, which is configured to release the front portion 316 and pet-engaging member 86a from the rear portion 320. Hair tool 310 further includes the same vibratory motor assembly as shown and described with respect to hair tool 10 to enable movement of hair tool 310 along the coat of an animal to remove loose hair without cutting the hair.

Figure 7:
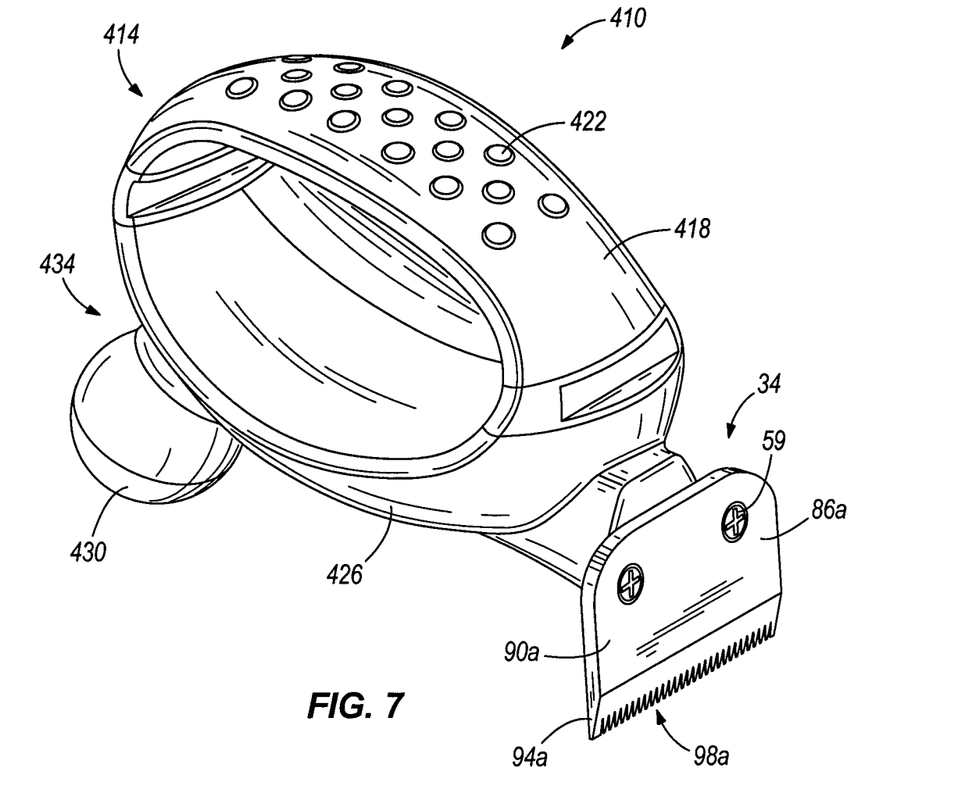
FIG. 7 is a perspective view of a hair tool according to another embodiment of the invention.

FIG. 7 shows a hair tool 410 according to another embodiment of the invention. The hair tool 410 shown in FIG. 7 includes similar structure to the hair tool 10 illustrated in FIGS. 1-4 and described above; therefore, like structure is identified by the same reference numeral. The hair tool 410 includes a housing 414 having a generally ovular shape. The upper housing 418 is spaced away from the lower housing 426 and includes a grip portion 422 configured to provide a comfortable grip for a user. The lower housing 426 includes a ball-shaped protrusion 430 extending from a rear portion 434 of the housing 414 opposite a grooming end 34 of the hair tool 410. In some embodiments, two, three or more protrusions may extend from the rear portion 434 of housing 414. Hair tool 410 further includes the same vibratory motor assembly as shown and described with respect to hair tool 10 to enable movement along the coat of an animal to remove loose hair without cutting the hair. In operation, the user holds the upper housing 418 and contacts the body of the animal with the lower housing 426. More specifically, the pet-engaging member 86a and the protrusion 430 contact the body of the animal 14. The pet-engaging member 86a enables hair removal, and protrusion 430 produces a massage effect onto the body of the animal 14. The massage effect soothes and calms the animal during the hair removal process.

Various features and advantages of the invention are set forth in the following claims.

What is claimed is:

1. A hair grooming tool comprising:
a housing defining a cavity, the housing including a grooming end and a handle end that define a longitudinal axis of the housing;
a vibratory motor assembly positioned within the cavity and configured to vibrate the housing; and
a pet-engaging member coupled to the housing at the grooming end, the pet-engaging member having a planar surface and teeth defined along an edge thereof, the planar surface and the edge positioned transverse to the longitudinal axis of the housing;
wherein vibration of the housing enables constant motion of the hair tool and movement of the pet-engaging member as the pet-engaging member is pulled through hair to remove loose hair without cutting the hair; wherein the housing further comprises an upper housing and a lower housing; and wherein the upper housing further includes a cover portion configured to substantially surround an upper portion of the pet-engaging member.

2. The hair grooming tool of claim 1 wherein the motor assembly includes a drive shaft and a vibration element configured to rotate and cause vibratory movement of the housing and the pet-engaging member coupled thereto.

3. The hair grooming tool of claim 1, and further comprising a battery configured to provide power to the motor assembly.

4. The hair grooming tool of claim 1 wherein the housing includes a grip.

5. The hair grooming tool of claim 1, and further comprising a protector configured to encompass teeth of the pet-engaging member when the hair grooming tool is not in operation.

6. The hair grooming tool of claim 1 wherein the pet-engaging member is rigidly secured to the housing by one or more fasteners.

7. The hair grooming tool of claim 1 wherein the pet-engaging member is configured to be pulled through the hair in a direction parallel to the longitudinal axis of the housing while maintaining contact with a body of an animal to remove loose hair without cutting the hair.

8. A hair grooming tool for use on an animal having a coat of hair, the hair grooming tool comprising:
a housing having a grooming end and a handle end that define a longitudinal axis of the housing;
a motor at least partially disposed in the housing, wherein the motor is a vibratory motor; and
a pet-engaging member coupled to the housing at the grooming end, the pet-engaging member having a planar surface and teeth defined along an edge thereof, the planar surface and the edge positioned transverse to the longitudinal axis of the housing;
wherein operation of the motor assembly causes vibration of the housing; and
further wherein the pet-engaging member is configured to be pulled in a first direction along the coat of the animal to remove loose hair without cutting the hair, such that the pet-engaging member follows the handle end in the first direction; wherein the housing further comprises an upper housing and a lower housing; wherein the upper housing includes a cover portion configured to receive an upper portion of the pet-engaging member.

9. The hair grooming tool of claim 8 wherein the pet-engaging member is coupled to the lower housing by one or more fasteners.

10. A hair grooming tool for removing loose hair from a coat of an animal, the hair grooming tool comprising:
a housing including an upper housing and a lower housing, the housing including a longitudinal dimension;
a motor assembly housed in a cavity defined by the upper housing and the lower housing and configured to vibrate the housing; and
a pet-engaging member coupled to the lower housing and configured for movement through the coat of the animal, the pet-engaging member having a planar surface and teeth defined along an edge thereof, the planar surface and the edge positioned transverse to the longitudinal dimension of the housing;
wherein vibration of the housing vibrates the pet-engaging member as the pet-engaging member is pulled through the coat of the animal to remove loose hair without cutting the hair; wherein the upper housing includes a cover portion to substantially surround an upper portion of the pet-engaging member.

11. The hair grooming tool of claim 10, further comprising a protector configured to protect the pet-engaging member when the hair tool is not in operation.

* * * * *